United States Patent
Galliani

(10) Patent No.: US 6,854,213 B2
(45) Date of Patent: Feb. 15, 2005

(54) SUPPORT SLIDE FOR WINDOW REGULATORS OF MOTOR VEHICLES

(75) Inventor: Guido Galliani, Genoa (IT)

(73) Assignee: Lames S.p.A., Genoa (IT)

( * ) Notice: Subject to any disclaimer, the term of this patent is extended or adjusted under 35 U.S.C. 154(b) by 0 days.

(21) Appl. No.: 10/617,824

(22) Filed: Jul. 14, 2003

(65) Prior Publication Data

US 2004/0107645 A1 Jun. 10, 2004

(30) Foreign Application Priority Data

Jul. 15, 2002 (IT) .................................... TO2002A0615

(51) Int. Cl.[7] .............................. B60J 1/16; E05F 11/38; E05F 1/00
(52) U.S. Cl. ......................................... 49/375; 49/374
(58) Field of Search .......................... 49/375, 374, 376, 49/349, 348, 351, 352, 502; 403/13; 52/716.5

(56) References Cited

U.S. PATENT DOCUMENTS

| | | | | |
|---|---|---|---|---|
| 4,762,904 A | * | 8/1988 | Nakama | 49/348 |
| 4,848,032 A | * | 7/1989 | Ballor et al. | 49/375 |
| 5,363,595 A | * | 11/1994 | Wirsing | 49/375 |
| 5,515,651 A | * | 5/1996 | Hofmann et al. | 49/375 |
| 5,546,704 A | * | 8/1996 | Maruoka | 49/375 |
| 5,729,930 A | * | 3/1998 | Schust et al. | 49/375 |
| 5,987,820 A | * | 11/1999 | Shibanushi | 49/375 |
| 6,205,711 B1 | * | 3/2001 | Klippert | 49/375 |
| 6,233,873 B1 | * | 5/2001 | Lawrie et al. | 49/375 |
| 6,453,617 B1 | * | 9/2002 | Klippert et al. | 49/375 |
| 6,460,296 B1 | * | 10/2002 | Arquevaux | 49/375 |
| 6,519,898 B2 | * | 2/2003 | Tatsumi et al. | 49/375 |
| 6,588,152 B2 | * | 7/2003 | Cabbane | 49/375 |
| 6,598,345 B1 | * | 7/2003 | Arimoto et al. | 49/374 |
| 6,729,073 B2 | * | 5/2004 | Nicolai | 49/375 |

* cited by examiner

Primary Examiner—Hugh B. Thompson, II
(74) Attorney, Agent, or Firm—Sughrue Mion, PLLC

(57) ABSTRACT

A support slide for window regulators of motor vehicles comprises a body formed, in a single piece of molded plastic material, by a plate portion and a lateral appendage. The plate portion constitutes a fixed jaw of a clamp for tightening a lower edge of a sliding window pane, and the lateral appendage has a sliding channel adapted to receive a guide rail. A movable jaw of the clamp cooperates with the fixed jaw to clamp the lower edge of the window pane. The shank of a screw for tightening the clamp is equipped with a spacer which is contained in a through-hole of the fixed jaw and which projects from the hole at least on the face of the plate portion which is turned towards the movable jaw to constitute an annular abutment surface.

9 Claims, 4 Drawing Sheets

SUPPORT SLIDE FOR WINDOW REGULATORS OF MOTOR VEHICLES

FIELD OF THE INVENTION

This invention relates to window regulators of motor vehicles and in particular provides a support slide for window regulators of motor vehicles, which support slide is of the type comprising:

a body formed by a plate portion and a lateral appendage, in which the plate portion constitutes a fixed jaw of a tightening clamp for a lower edge of a sliding window pane and the lateral appendage has a sliding channel adapted to receive a guide rail, a movable jaw of the clamp, constituted by a shaped element cooperating with the fixed jaw to clamp the lower edge of the window pane, and a tightening screw for tightening the clamp, with a threaded shank which extends through a transverse through-hole in the plate portion and engages a threaded hole in the movable jaw, and with a head located on a face of the plate portion opposite to the face turned towards the movable jaw.

BACKGROUND ART

German published Patent Application No. 199 43 717 discloses a slide of the type considered, the constituent material of whose body is not specified.

The manufacturing of the body of this known slide by injection molding of a cheap plastic material, which preferably should be wear resistant and have a low coefficient of friction, would be desirable in that it could be carried out at very low costs.

Moreover, the use of a plastic material with a low coefficient of friction would allow the lateral appendage of the body to smoothly slide along the guide rails of the window regulator with minimal forces of friction.

However, a direct contact of both the head of the tightening screw of the clamp and the movable jaw with the plastic material which constitutes the plate portion would be undesirable, since its plastic material, if it is of an inexpensive quality, in the greatest part of the cases would undergo inadmissible deformation by squashing.

On the other hand, the use of a special squash-resistant plastic material, such as a polytetrafluoroethylene or another technopolymer, would involve an inadmissible cost in the mass-production of window regulators.

SUMMARY OF THE INVENTION

The object of the invention is to economically provide a slide of the kind considered, which is adapted to resist without slackening and damages to high clamping forces of the clamp and which can smoothly slide along the guide rails of the window regulator with minimal forces of friction.

The invention accordingly provides a support slide for window regulators of motor vehicles, wherein the body formed by the plate portion and the lateral appendage is constituted by a single injection-molded piece of a plastic material, and wherein the shank of the screw is equipped with a spacer which is contained in the through-hole and which projects from the hole at least on the face of the plate portion which is turned towards the movable jaw to constitute an annular abutment surface for the movable jaw.

According to the invention, thanks to the provision of a spacer which avoids a direct contact of the head of the screw and the movable jaw with the plate portion, to produce the latter it is instead possible to use an ordinary and little valuable plastic material, preferably wear-resistant and with a low coefficient of friction for its sliding along the rail, but not having a particular mechanical strength, since the plate portion is not required to resist to any compression force due to the tightening of the clamp.

BRIEF DESCRIPTION OF THE DRAWINGS

The invention will be better clarified by the reading of the detailed description which follows of preferred embodiments thereof, given by way of non-limiting example and shown in the attached drawings, in which.

BEST MODES OR CARRYING OUT THE INVENTION

Figure 1:
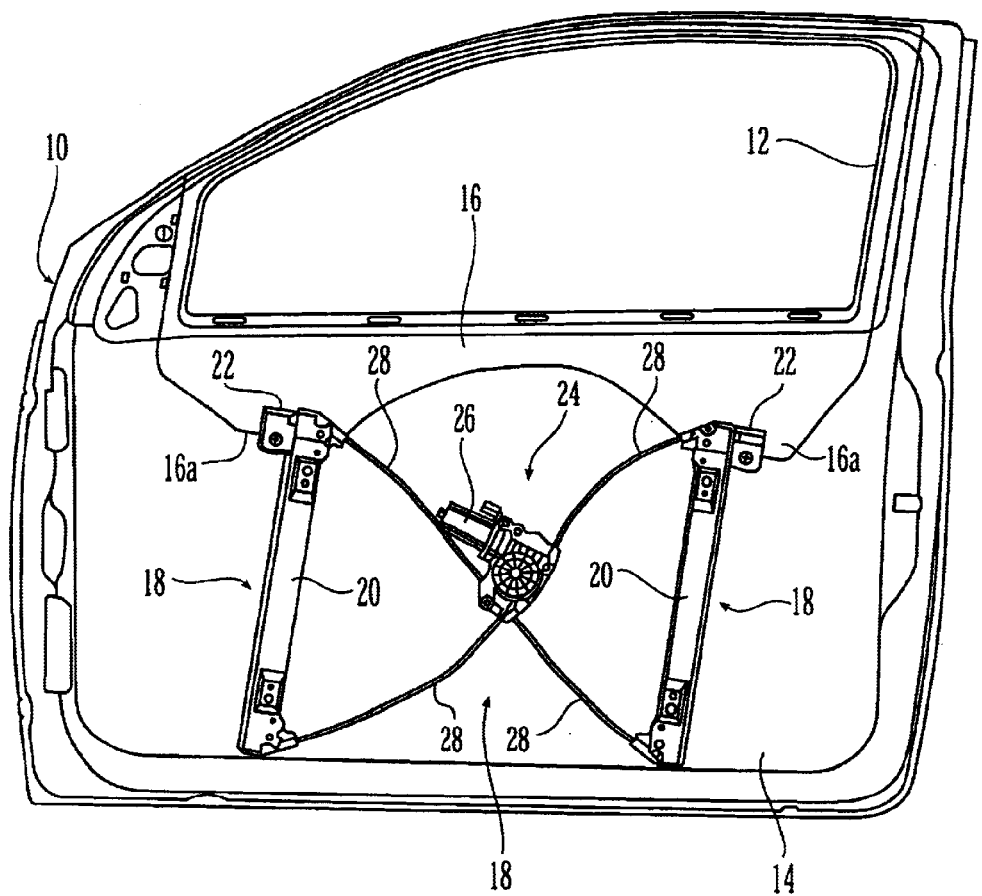
FIG. 1 is a partial schematic elevational view of a motor vehicle door provided with a window regulator with flexible transmission cables of the twin-guide type, having a slide according to the invention associated to each of its guide rails.

Referring to FIG. 1, a motor vehicle door comprises a sheet metal shell, generally indicated 10, with an upper portion having an opening which constitutes a window frame 12, and with a lower room 14.

A window pane 16 is mounted in the shell 10 and is adapted to slide between a raised position, in which it is inserted in the frame 12, and a lowered position, in which it is at least partially lowered in the room 14.

A drive assembly, generally indicated 18, is fixed in the room 14 to raise and lower the window pane 16.

The drive assembly 18 comprises a pair of fixed guide rails 20 which extend parallel to each other in the direction of movement of the window pane 16. A respective slide 22 is adapted to travel along each rail 20 and supports the window pane 16 from a lower edge 16a of the latter.

Figure 7:
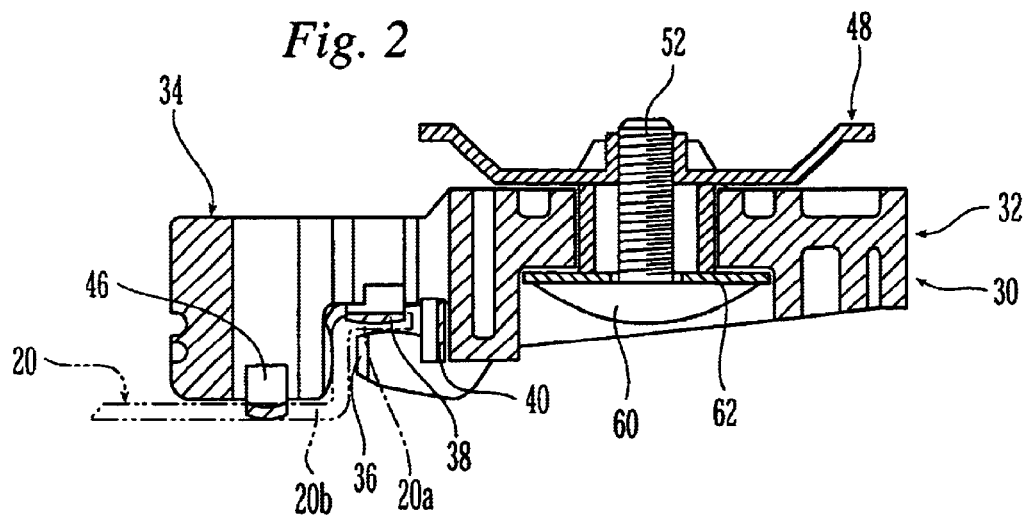
FIG. 7 is a cross section taken along the plane indicated by the line VII—VII in FIG. 6.

In the embodiment shown, each rail 20 has a square z-profile, as shown in dotted lines in FIG. 7.

A control unit 24, which is fixed in the room 14 as well, comprises a reversible electric motor 26 and a drum (not shown) which, in a known manner, is drivingly connected to the two slides 22 by respective pairs of flexible transmission members 28, which in FIG. 1 are constituted by sheathed cables, but which may also consist of endless transmission cables.

Figure 8:
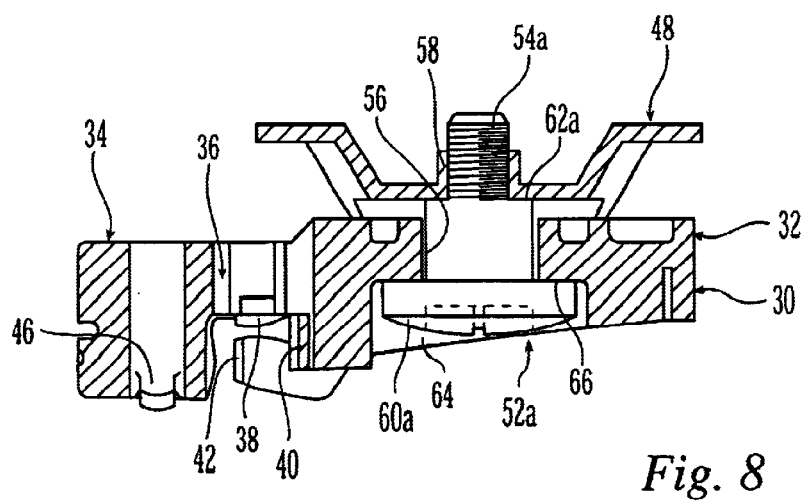
FIG. 8 is a cross section analogous to that of FIG. 7, which shows a modification of the tightening screw.
Figure 2:
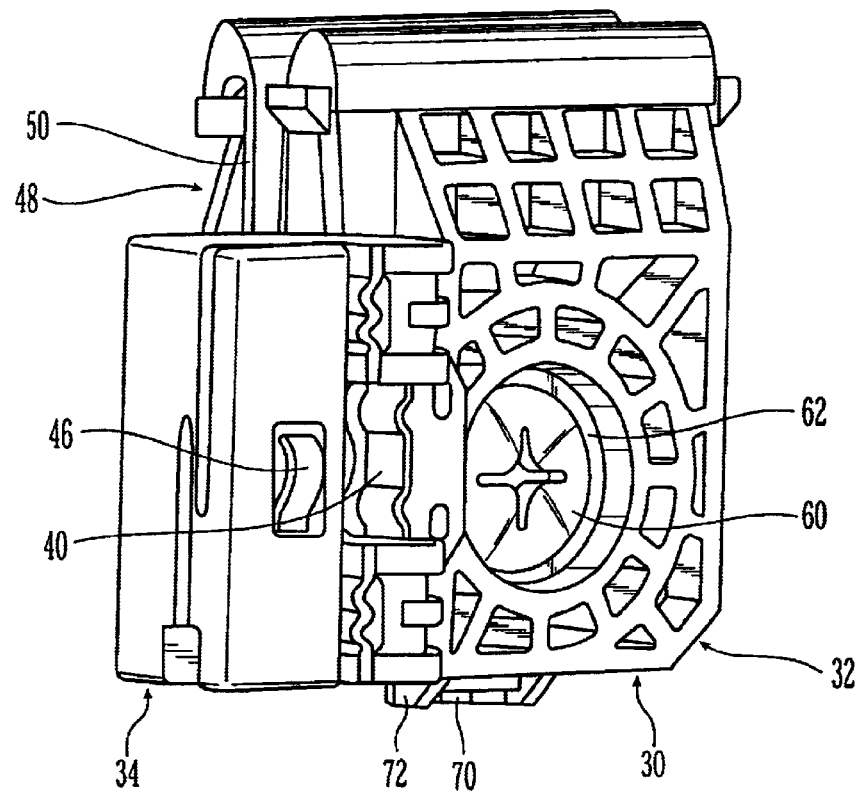
FIG. 2 is an enlarged perspective view of the sole slide.

In FIG. 1 a window regulator of the twin-guide type has been shown by way of example, but the invention can also be applied to a window regulator with a single guide rail provided with a slide 22 such as that shown in FIGS. 2 to 7 or in FIG. 8, and which will be now described.

Referring to FIGS. 2 to 7, the slide 22 according to the invention comprises a flat body 30 which is formed, as a single piece of injection-molded plastic material, by a plate portion 32 and a lateral appendage 34.

The body 30 is preferably of a wear-resistant plastic material with a low coefficient of friction, such as for example an acetal resin or a polyamide which may contain polytetrafluoroethylene as a filler.

Figure 6:
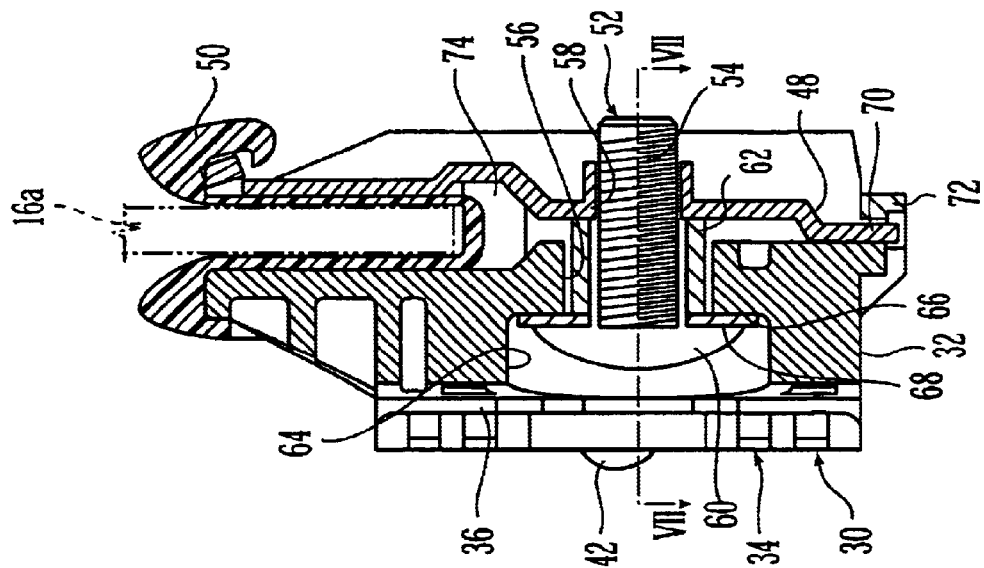

The plate portion 32 constitutes a fixed jaw of a tightening clamp for clamping a lower edge 16a of the window pane 16, also shown in dotted lines in FIG. 6.

The lateral appendage 34 has an L-section sliding channel 36 (FIGS. 2, 3, 6 and 7), which is adapted to receive a wing 20a and a web 20b of the guide rail 20, as shown in FIG. 7.

Preferably, spring members in the form of bridges 38, 40, 44 are formed in the channel 36 to take up possible plays between the rail 20 and the slide 30.

The bridge 38, which is located in the middle region of the channel 36, has an Ω configuration and its back is adapted to frontally engage the wing 20a of the rail 20, as shown in FIG. 7.

The bridge 40, which is also located in the middle region of the channel 36, has an undulated shape and the backs of its undulations are adapted to laterally engage the edge of the wing 20a of the rail 20, still as shown in FIG. 7.

The bridges 42, which are two in number, are located towards the opposite ends of the channel 36 and have an undulated shape as well. The backs of their undulations are adapted to engage a corresponding side face of the web 20b of the rail 20, as shown in FIG. 7.

Figure 3:
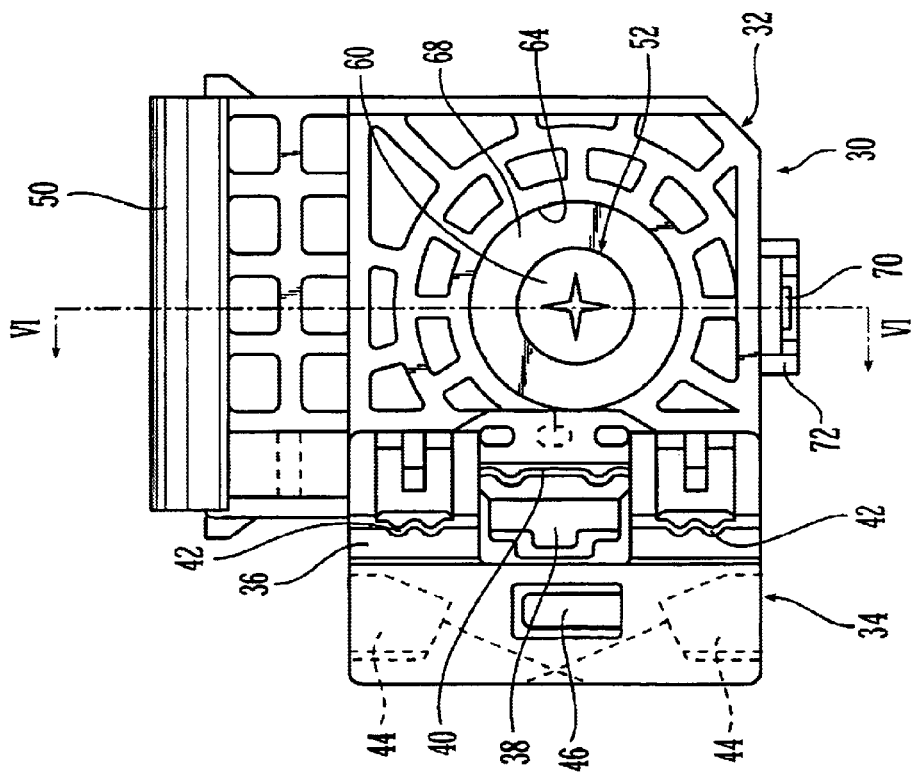
FIG. 3 is an elevational view of the slide from the side visible in FIG. 2.

For the use of the slide 22 in a window regulator with flexible transmission cables such as that of FIG. 1, the lateral appendage 34 also has, next to the sliding channel 36, inner formations 44, shown in dotted lines in FIG. 3, for the anchorage of the two ends of the flexible transmission members 28 of FIG. 1, in order to transmit the motion to the slide 22.

Still in the location of the anchoring formations 44, in the lateral appendage 34 there is formed a spring member, having the shape of an arcuate tongue 46 (FIGS. 2, 3 and 7), whose back is adapted to frontally engage, from the outside of the appendage 34, the other wing 20c of the rail 20, to take up the possible play between the latter and the slide 30 as well, as shown in FIG. 7.

The tightening clamp for the lower edge 16a of the window pane 16 also comprises a movable jaw 48 constituted by a stamped sheet metal piece, which cooperates with the fixed jaw constituted by the plate portion 32 in order to clamp the lower edge 16a of the window pane 16, as shown in particular in FIG. 6.

A U-shaped lining 50 is interposed, in the usual way, between the two jaws 32, 40 and receives the lower edge 16a of the window pane 16.

For the tightening of the jaws 32, 48, a clamp tightening screw 52 is provided, with a threaded shank 54 which extends through a through-hole 56 (FIGS. 5, 6 and 7) in the plate portion 32 and which engages a threaded hole 58 in the movable jaw 48, and with a head 60 which is located on a face of the plate portion 32 which is away from the face turned towards the movable jaw 48.

According to the invention, in the through-hole 56 of the plate portion 32 there is provided a spacer in the form of a bushing 62, a steel bushing for example, through which the shank 54 of the tightening screw 52 freely extends.

The bushing 62 may simply be inserted with a sliding fit in the through-hole 56, may be driven in the latter with a slight force fit, or may have been incorporated in the plate portion 32 during its molding.

In any case, the metal bushing 62 has such a length that it projects from both the opposite sides of the plate portion 32 to constitute opposite annular end surfaces for the abutment of the head 60 of the screw 52 and of the movable jaw 48, respectively.

Preferably, the face of the plate portion 32, which corresponds to the head 60 of the screw 52, has a circular recess 64 (FIGS. 2, 3, 6 and 7) to receive the head 60, having a bottom surface 66 (FIGS. 6 and 7) with respect to which the corresponding ends of the bushing 62 project.

Also preferably, a stress-distribution washer 68 is located in the recess 64 and is interposed between the head 60 of the screw 52 and the corresponding projecting end of the bushing 62.

Advantageously, the movable jaw 48 is kept together with the fixed jaw constituted by the plate portion 32 by means of a tab 70 which has been obtained by cutting the metal sheet of the movable jaw 48 and which is inserted with play in a square loop portion 72 formed by stamping in the body 30.

Figure 4:
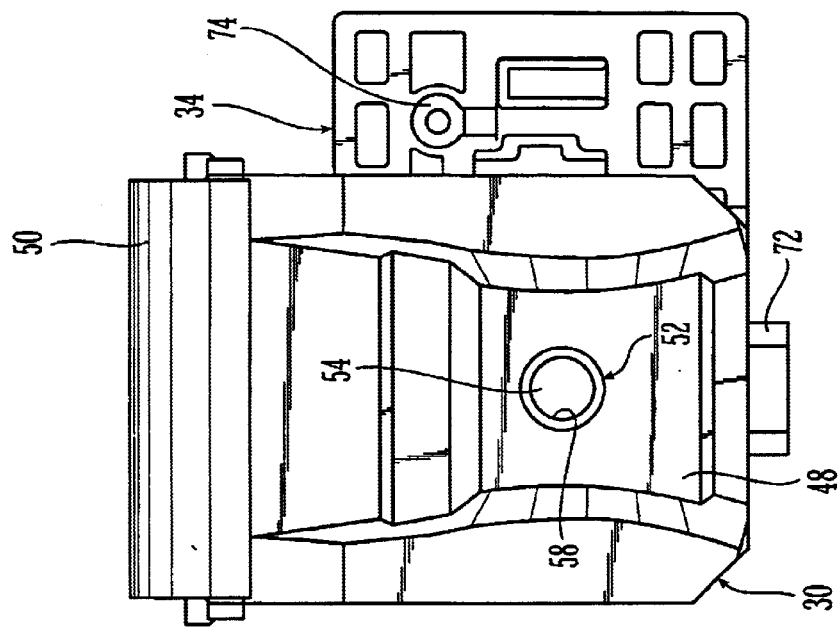
FIG. 4 is an elevational view thereof from the side opposite to that of FIG. 2.
Figure 5:
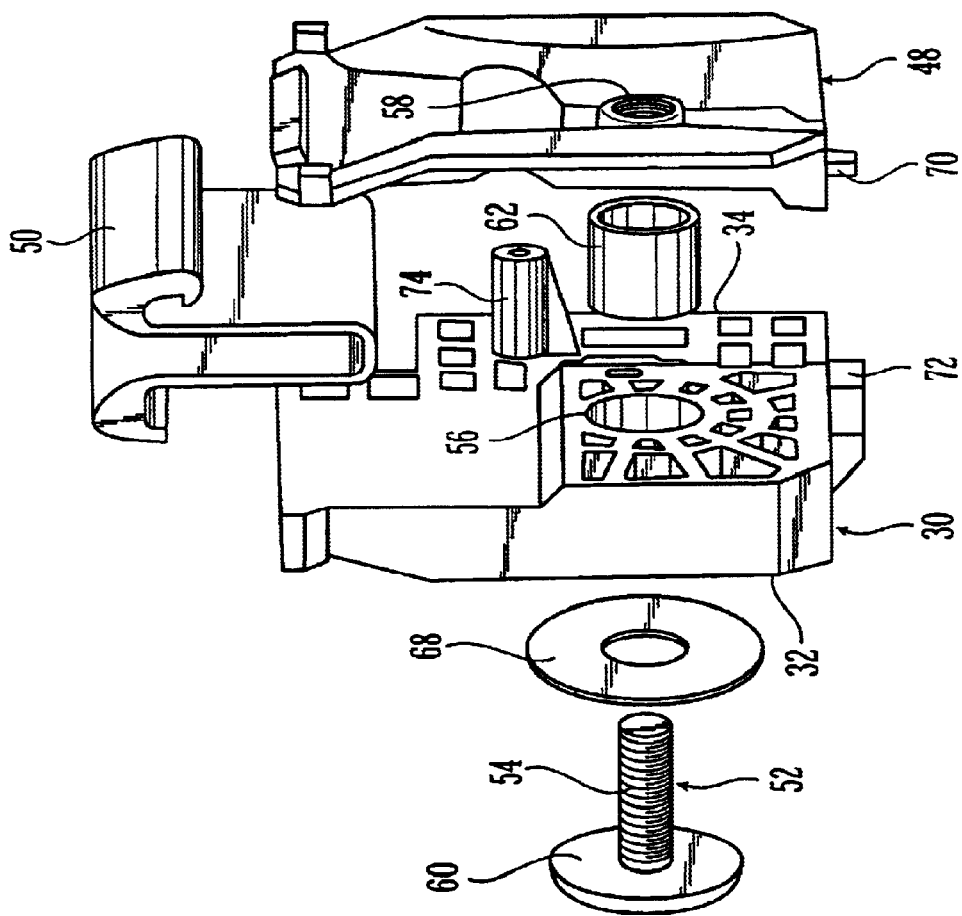
FIG. 5 is an exploded perspective view thereof, FIG. 6 a median section taken along the plane indicated by the line VI—VI in FIG. 3.

Also advantageously, an abutment stud 74, which can be seen in FIGS. 4, 5 and 6, is formed by molding on the face of the plate portion 32 which is turned towards the movable jaw.

The stud 74 acts as a rest for the lower edge 16a of the window pane 16 to make sure that this edge does not come to force on to the bottom of the U-shaped liner 50 with the risk of breaking it or, even worse, of misplacing it.

As can be seen in all the FIGS. 2 to 7, respective arrays of strengthening ribs are advantageously molded in the two opposite faces of the body 30.

Reference to FIG. 8 will now be made to describe a modification of the tightening screw, indicated 52a, and of the corresponding spacer, indicated 62a.

In FIG. 8 the portions of the body 30 of plastic material are indicated with the same reference numerals as in the preceding figures.

In FIG. 8 the tightening screw is indicated 52a, its threaded shank is indicated 54a and its head is indicated 60a.

The spacer is constituted by a cylindrical section 62a of the shank 54a, which is contained in the hole 56 and projects from the hole 56 on the face of the plate portion 32 which is turned towards the movable jaw 48, while the head 60 of the screw 52 abuts onto the bottom wall 66 of the cylindrical recess 64 of the plate portion 32.

The head 60a of the screw 52a has a relatively large diameter and occupies the whole space of the cylindrical recess 64 in order to distribute as much as possible the tightening force on the bottom wall 66.

The cylindrical section 62a of the shank 54a offers a ring-like abutment surface to the movable jaw 48, which prevents it from coming into contact with the plate portion 32 and from damaging the latter when the clamp is tightened.

I claim:

1. A support slide for window regulators of motor vehicles, comprising:
    a body formed by a plate portion and a lateral appendage, in which the plate portion constitutes a fixed jaw of a tightening clamp for a lower edge of a sliding window pane and the lateral appendage has a sliding channel adapted to receive a guide rail,
    a movable jaw of the clamp, constituted by a shaped element cooperating with the fixed jaw to clamp the lower edge of the window pane, and
    a tightening screw for tightening the clamp, with a threaded shank which extends through a transverse through-hole in the plate portion and engages a threaded hole in the movable jaw, and with a head located on a face of the plate portion opposite to the face turned towards the movable jaw, wherein the body formed by the plate portion and the lateral appendage is constituted by a single injection-molded piece of a plastic material, and wherein the shank of the screw is equipped with a spacer which is contained in the through-hole and which projects from the hole at least on the face of the plate portion which is turned towards the movable jaw to constitute an annular abutment surface for the movable jaw.

2. The support slide as claimed in claim 1, wherein the spacer is constituted by a metal spacer bushing contained in the through-hole of the plate portion and through which the shank of the tightening screw freely extends, and wherein the spacer bushing has such a length as to project from both the opposite sides of the plate portion to constitute opposite abutment annular end surfaces for the movable jaw and the head of the screw, respectively.

3. The support slide as claimed in claim 1, wherein the spacer is constituted by a cylindrical section of the shank of the tightening screw, which section projects from the hole on the face of the plate portion which is turned towards the movable jaw, while the head of the screw abuts on the opposite face of the plate portion.

4. The support slide as claimed in claim 1, wherein the lateral appendage of the body further has formations for the anchorage of two ends of flexible transmission members in order to transmit motion to the slide.

5. The support slide as claimed in claim 1, wherein the face of the plate portion which corresponds to the head of the screw has a recess in which the head of the screw is received.

6. The support slide as claimed in claim 1, wherein the slide comprises a washer to distribute the tightening force of the screw, and the washer is interposed between the head of the screw and a projecting end of the spacer.

7. The support slide as claimed in claim 1, wherein the plastic material of the body is an acetal resin.

8. The support slide as claimed in claim 1, wherein the plastic material of the body is a polyamide.

9. The support slide as claimed in claim 1, wherein the body comprises molded spring members to take up play between the guide rail and the slide.

* * * * *